United States Patent
Eickelberg

(10) Patent No.: US 11,383,822 B2
(45) Date of Patent: Jul. 12, 2022

(54) DISTRIBUTED ACTIVE BRAKES FOR AIRCRAFT HIGH-LIFT DEVICES

(71) Applicant: The Boeing Company, Chicago, IL (US)

(72) Inventor: John Lars Eickelberg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 16/879,502

(22) Filed: May 20, 2020

(65) Prior Publication Data

US 2021/0362835 A1   Nov. 25, 2021

(51) Int. Cl.
| | |
|---|---|
| *B64C 9/32* | (2006.01) |
| *B64C 13/34* | (2006.01) |
| *B64C 13/50* | (2006.01) |
| *B64C 9/20* | (2006.01) |
| *B64C 9/26* | (2006.01) |

(52) U.S. Cl.
CPC .............. *B64C 9/323* (2013.01); *B64C 13/34* (2013.01); *B64C 13/503* (2013.01); *B64C 9/20* (2013.01); *B64C 9/26* (2013.01)

(58) Field of Classification Search
CPC ....... B64C 9/323; B64C 13/34; B64C 13/503; B64C 9/20; B64C 9/26
See application file for complete search history.

(56) References Cited

U.S. PATENT DOCUMENTS

| | | | |
|---|---|---|---|
| 4,317,424 A * | 3/1982 | Steadman | F16D 43/216 116/294 |
| 4,441,675 A | 4/1984 | Boehringer et al. | |
| 4,864,882 A | 9/1989 | Capewell | |
| 5,944,148 A | 8/1999 | Bae et al. | |
| 8,746,614 B2 | 6/2014 | Heintjes | |
| 9,739,316 B2 | 8/2017 | Schwartz et al. | |
| 2002/0030138 A1* | 3/2002 | Serven | B64C 13/34 244/99.2 |
| 2019/0101169 A1 | 4/2019 | Larson | |
| 2020/0307775 A1* | 10/2020 | Tzabari | B64C 13/38 |

FOREIGN PATENT DOCUMENTS

EP   1803644 B1   1/2012

* cited by examiner

*Primary Examiner* — Rodney A Bonnette
(74) *Attorney, Agent, or Firm* — Kolisch Hartwell, P.C.

(57) ABSTRACT

Aircraft high-lift device brake apparatus, distributed high-lift device brake systems, and methods of actuating such distributed high-lift device brake systems, where each high-lift device brake apparatus includes an extendable high-lift device, an actuator coupled to the high-lift device that can extend or retract the extendable high-lift device, a torque tube coupled to a remote drive unit so that rotation of the torque tube activates the actuator, and a high-lift device brake that includes, in turn, a brake assembly capable of locking the associated high-lift device in its current position, a torque-based brake activator configured to activate the brake assembly when an applied torque exceeds a predetermined threshold, and a flight control brake activator configured to activate the brake assembly when the flight control brake activator receives an activation signal from the flight control system of the aircraft.

20 Claims, 5 Drawing Sheets

DISTRIBUTED ACTIVE BRAKES FOR AIRCRAFT HIGH-LIFT DEVICES

FIELD

This disclosure relates to high-lift devices for aircraft, and more particularly, the disclosure relates to systems for the active braking of aircraft high-lift devices.

INTRODUCTION

The design of modern aircraft wings reflects a complex compromise between several conflicting design factors. While a wing can be designed to emphasize fuel efficiency, lift, air velocity, or even reduced flight noise, no wing design can maximize all of these parameters. Emphasis is therefore typically placed on wing design that provides enhanced performance at cruising speeds, so as to provide the greatest advantage for the longest portion of a typical flight.

Unfortunately, a wing that provides enhanced fuel efficiency at cruising speed, for example, may exhibit poor performance at take-off and landing speeds. For this reason the wings of contemporary aircraft incorporate high-lift devices such as flaps and slats, which are in effect extensions of the wing. With flaps and slats extended, the wing produces enhanced lift at slower takeoff and landing speeds, but by retracting the flaps and slats the more efficient cruise configuration of the wing can be restored.

Each high-lift device is actuated by one or more drive mechanisms, which are coupled to the internal structure of the wing. Depending upon the particular type of high-lift device being actuated, the drive mechanism may include a rotary actuator coupled to a pinion gear to rotate the high-lift device, or a mechanical linear actuator to translate the high-lift device. The actuators for a given set of high-lift devices along a leading or trailing edge of a wing are typically coupled to torque tubes driven by a remote power drive unit that transfers torque to each of the high-lift device actuators. Each of the high-lift devices in a series are typically controlled to move simultaneously between a stowed configuration and an extended configuration.

Unfortunately, a disruption of the torque tube drive system may result in one or more high-lift devices being deployed in an asymmetrical condition, where the position and/or movement of one or more high-lift devices is not synchronized with the remaining high-lift devices in the series. In order to prevent a worsening asymmetrical or uncommanded positioning of a high-lift device due to a failure of a torque tube, the aircraft may incorporate certain protective systems, such as for example a series of no-back devices at each drive station that are configured to brake lock the associated disconnected high-lift device. The no-back devices prevent a high-lift device from being "blown back" to a cruising position or further extended by the aerodynamic loads placed upon it.

As with any aircraft safety system, the braking system for the high-lift devices may be periodically inspected to confirm its reliability. Such testing, however, can require that the torque tube drive system be physically disconnected from the high-lift device braking system in order to verify it is functioning properly, a process that can be laborious and time-consuming, while also creating an opportunity for an error in reconnecting the drive systems.

SUMMARY

The present disclosure provides high-lift device brakes for aircraft, distributed high-lift device brake systems for aircraft, and methods of actuating distributed brake systems for high-lift devices of aircraft.

In some examples, the present disclosure relates to high-lift device brakes for aircraft, including an extendable high-lift device; an actuator coupled to the extendable high-lift device such that activation of the actuator extends or retracts the extendable high-lift device; a torque tube coupled to a remote drive unit, where rotation of the torque tube activates the actuator; and a high-lift device brake. The high-lift device brake includes a brake assembly capable to lock the high-lift device in a current position, a torque-based brake activator configured to activate the brake assembly when a torque applied to the actuator by the torque tube exceeds a predetermined threshold, and a flight control brake activator configured to activate the brake assembly to lock the high-lift device in the current position when the flight control brake activator receives an activation signal from a flight control system of the aircraft.

In some examples, the present disclosure relates to distributed high-lift device brake systems for aircraft, including a plurality of extendable high-lift devices; a plurality of actuators, each actuator coupled to each extendable high-lift device such that activation of said actuator extends or retracts the coupled extendable high-lift device; a torque tube coupled to each of the plurality of extendable high-lift devices, where the torque tube is driven by a remote drive unit, and where the plurality of actuators coupled to the plurality of extendable high-lift devices is configured for activation by rotation of the torque tube by the remote drive unit; and a high-lift device brake associated with each of the plurality of extendable high-lift devices, each high-lift device brake including a brake assembly capable to lock said high-lift device in a current position; a torque-based brake activator configured to activate the brake assembly when a torque applied to said actuator, coupled to said high-lift device, by said torque tube exceeds a predetermined threshold; and a flight control brake activator configured to activate at least said brake assembly and lock said extendable high-lift device in the current position when the flight control brake activator receives an activation signal from a flight control system of the aircraft.

In some examples, the present disclosure relates to methods of actuating a distributed brake system for a plurality of high-lift devices of an aircraft, where each high-lift device is coupled to a high-lift device brake; the method including detecting, by a position sensor, at least one extendable high-lift device of the plurality of extendable high-lift devices in an unsynchronized position relative to a remainder of the plurality of extendable high-lift devices; transmitting, by the position sensor to a flight control system of the aircraft, a signal that the at least one high-lift device is in the unsynchronized position; receiving, by the flight control system of the aircraft, the signal transmitted by the position sensor; transmitting, in response to the signal received from the position sensor, an activation signal by the flight control system of the aircraft to a flight control brake activator of the high-lift device brake associated with the at least one extendable high-lift device in the unsynchronized position; and activating, by the flight control brake activator, a brake assembly of the high-lift device brake associated with the at least one extendable high-lift device in the unsynchronized position.

Features, functions, and advantages can be achieved independently in various examples of the present disclosure, or can be combined in yet other examples, further details of which can be seen with reference to the following description and drawings.

DETAILED DESCRIPTION

Figure 1:
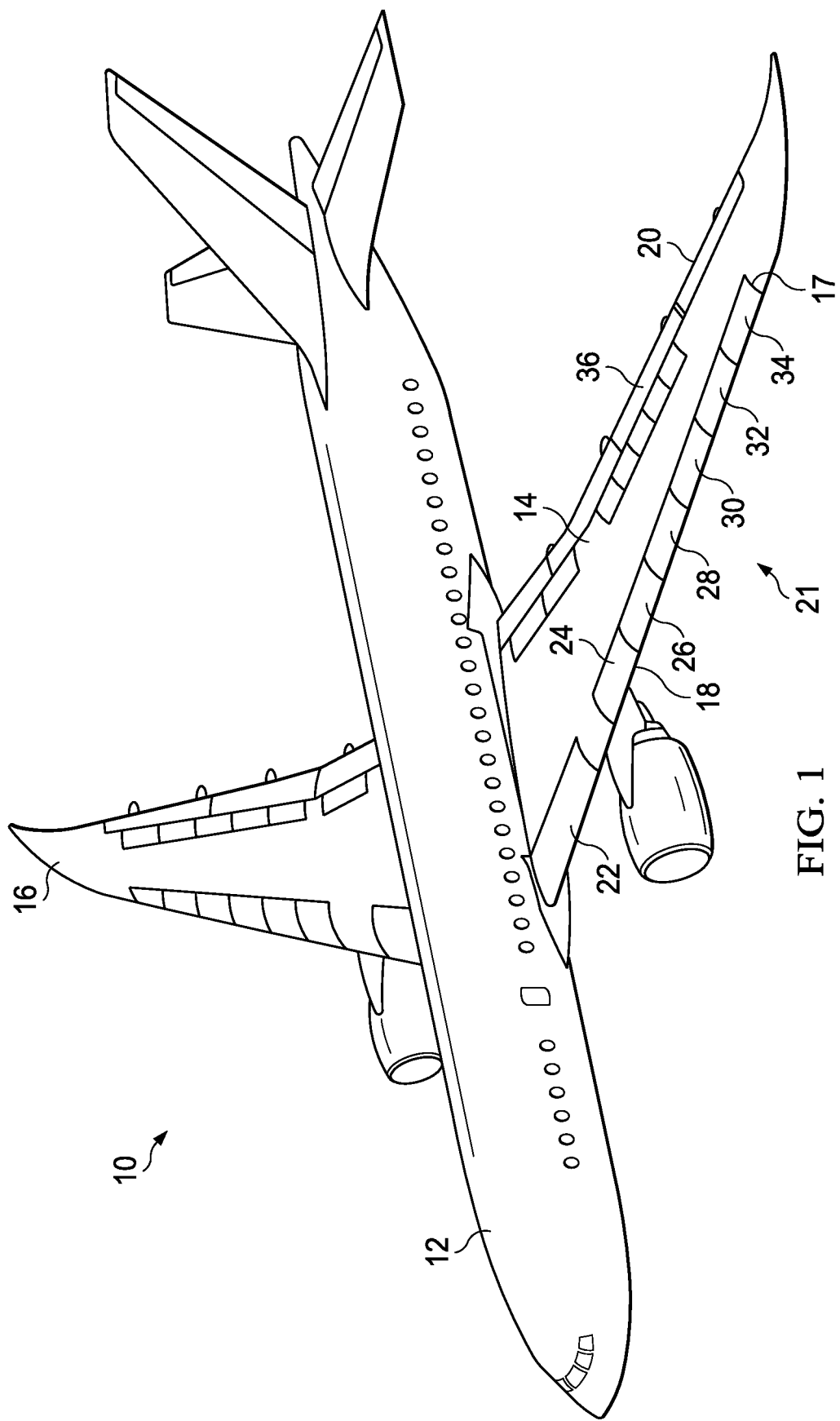
FIG. 1 depicts an illustrative aircraft in which the exemplary distributed high-lift device brake systems and related systems and methods can be implemented.

Various aspects and examples of high-lift devices, brakes for high-lift devices, and brake systems for high-lift devices, and their use are described below and illustrated in the associated drawings. Unless otherwise specified, the distributed active brakes, brake systems, and methods of use may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples described below are illustrative in nature and not all examples provide the same advantages or the same degree of advantages.

This Detailed Description includes the following sections, which follow immediately below: (1) Definitions; (2) Overview; (3) Examples, Components, and Alternatives; (4) Methods of Actuation; (5) Illustrative Combinations and Additional Examples; (6) Advantages, Features, and Benefits; and (6) Conclusion.

(1) Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

(2) Overview

The distributed brake systems for high-lift devices of the present disclosure provide a useful active aircraft safety system, particularly when the ability of an extended drive system such as a torque tube to regulate movement of a set of high-lift devices may be compromised. The distributed brake systems can provide enhanced aircraft safety and greater specificity in high-lift device control while simultaneously simplifying the high-lift device control mechanism, and eliminating the need for testing that may require that a torque tube be disconnected from the high-lift device. The presently disclosed apparatus and systems have particular utility for commercial aircraft, but this should not be considered to limit the utility or applicability of the present distributed brake systems in any way.

(3) Examples, Components, and Alternatives

A high-lift device is a component or mechanism on an aircraft's wing that can increase the amount of lift produced by the wing. These high-lift devices are typically configured to be deployed and/or extended to provide enhanced lift during takeoffs and landings. When deployed, a high-lift device or a set of high-lift devices acts to increase the effective size, curvature camber, and/or area of the wing on which the high-lift devices are deployed, thereby increasing the lift of the wing.

While a high-lift device may be a fixed component of an aircraft, the present disclosure is directed to high-lift devices that are movable, that is they are deployed when required, and therefore incorporate a mechanism that moves them appropriately so as to effect deployment. Common movable high-lift devices include wing flaps and slats.

A flap is a movable portion of a wing that can be lowered to reshape the wing profile and/or increase the wing area, producing increased lift. Flaps are typically located on the trailing edge of a wing, although leading edge flaps are used occasionally, such as Krueger flaps that are typically located on the leading edge of the wing and adjacent the fuselage. Flaps can be configured to be translated and/or extended rearward when deployed, typically by an appropriate actuator.

Slats, in contrast, are typically attached to the leading edge of a wing. When deployed, slats can permit air to flow more smoothly over the upper surface of a wing at higher angles of attack, allowing the wing to operate effectively even at the higher angles of attack required to produce more lift. Slats can be configured to be rotated and/or extended from the leading edge of the wing when deployed, typically by an appropriate actuator.

FIG. 1 illustrates an exemplary aircraft 10 in which the high-lift device brakes and brake systems of the present disclosure can be implemented. Aircraft 10 includes a fuselage 12, and a first wing 14 and second wing 16 coupled to fuselage 12. The first and second wings 14 and 16 can include a plurality of control surfaces, including a plurality of high-lift devices 17 such as, for example, auxiliary airfoils, slats, Krueger flaps, and trailing edge flaps, among others. These high-lift devices are typically located along the leading edges 18 and trailing edges 20 of the first and second wings 14, 16.

For example, first wing 14 can include a system of extendable high-lift devices 21. Where the system of extendable high-lift devices 21 is a system of deployable slats, the slat system can include a first slat 22, a second slat 24, a third slat 26, a fourth slat 28, a fifth slat 30, a sixth slat 32, and a seventh slat 34 located along leading edge 18 of wing 14, and a flap 36 located along trailing edge 20 of wing 14. First wing 14 can include more or fewer slats and/or flaps. Additionally or alternatively, first wing 14 can include additional or alternative control surfaces such as ailerons, spoilers, tabs, trailing edge slats. Second wing 16 is equivalent to first wing 14 and therefore will typically include a similar type and number of high-lift devices as those described for first wing 14, they will not be specifically discussed in order to avoid redundancy.

In general, each of the high-lift devices 17 in high-lift device system 21 can be deployed using any appropriate drive mechanisms or actuators. However, the respective actuators of individual slats are typically coupled to one another and to a single drive mechanism, in order to facilitate a simultaneous and synchronized operation of each slat. As shown in the exemplary configuration of FIG. 2, a single drive mechanism can include a torque tube assembly 38 that extends along wing 14, where torque tube assembly 38 can be rotated, or driven, by a remote drive unit 39. A single remote drive unit 39 can be used to power each of slats 24-34 using torque tube assembly 38.

Figure 2:
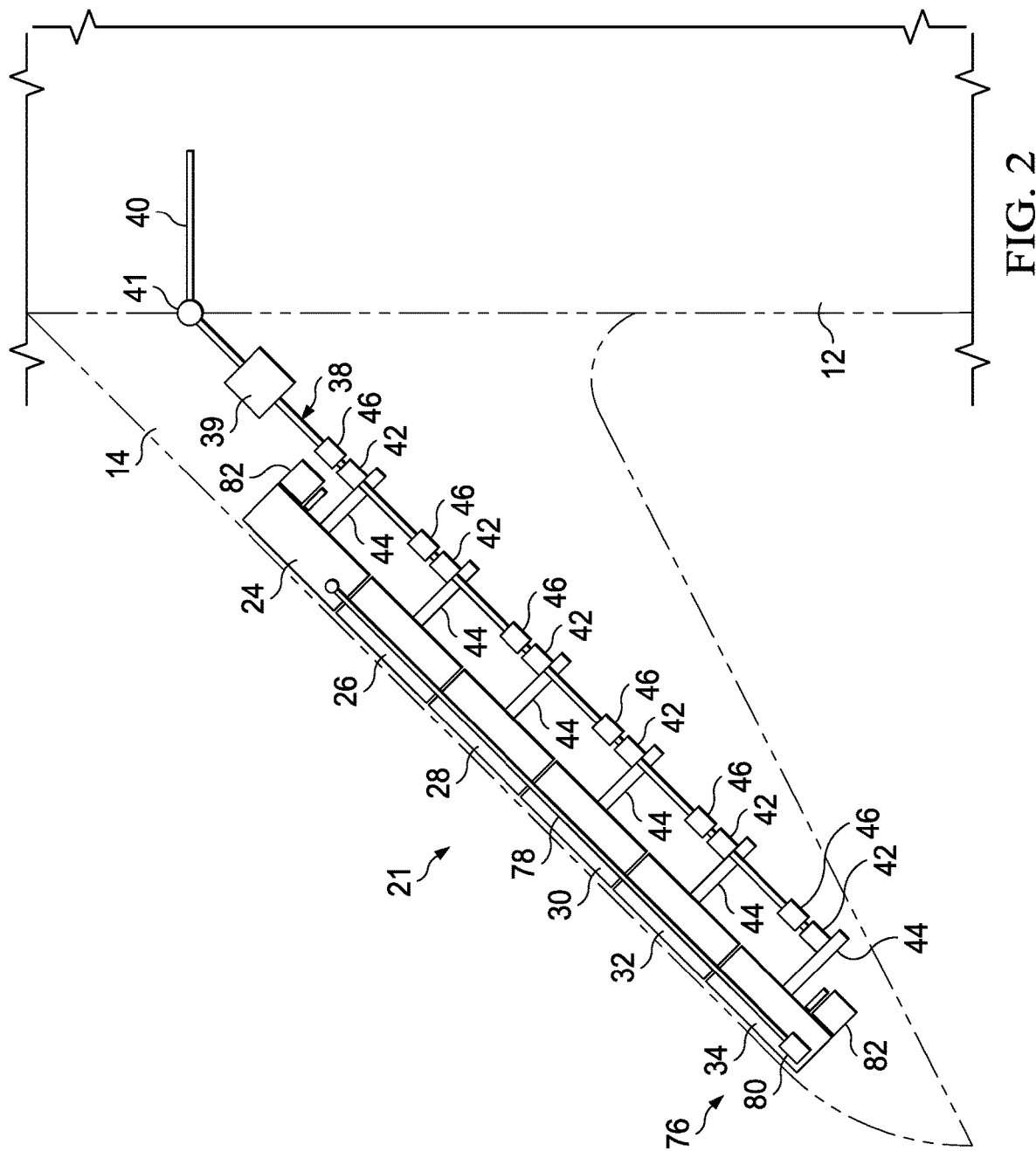
FIG. 2 semi-schematically depicts an illustrative distributed high-lift device brake system for an aircraft according to the present disclosure.

Also as shown in FIG. 2, aircraft 10 can additionally include a drive linkage 40 from remote drive unit 39 to a corresponding torque tube assembly disposed in wing 16 via an angle gearbox 41, for example. In this way, all of the slats along the leading edges 18 of wings 14 and 16 can be deployed simultaneously using a single drive unit.

Torque tube assembly 38 typically deploys a coupled extendable high-lift device 17 via an intermediate actuator 42. Actuator 42 can be a linear actuator, a rotary actuator, or any other suitable actuator mechanism. Actuator 42 can couple torque tube assembly 38 to extendable high-lift device 17 via an intermediate mechanism 44 that is configured to deploy extendable high-lift device 17 when actuator 42 is activated, or driven, by torque tube assembly 38. For example, actuator 42 can be a geared rotary actuator that is coupled via an intermediate pinion gear to an extendable high-lift device 17 that is a slat. Torque tube assembly 38 can also retract the coupled extendable high-lift device 17 by reversing and/or retracting actuator 42, which then retracts or stows the coupled extendable high-lift device 17 also via the function of intermediate mechanism 44.

Although the schematic of FIG. 2 shows a single actuator 42 and intermediate mechanism 44 for each slat in the slat system 21, a high-lift device typically has more than a single mechanical connection to the torque tube assembly, each with a corresponding actuator. Similarly, although torque tube assembly 38 is shown and described in relation to slats 24-34 in FIG. 2, it is understood that the examples disclosed herein can be similarly applied to any of the other high-lift device systems, and in particular can be applied analogously to a system including one or more trailing edge flaps 36.

Also shown in FIG. 2 is a system of distributed high-lift device brakes 46 according to the present disclosure. The high-lift device brakes 46 are distributed in the sense that each extendable high-lift device in the depicted slat system 21 can be individually coupled to an associated high-lift device brake 46.

Figure 3:
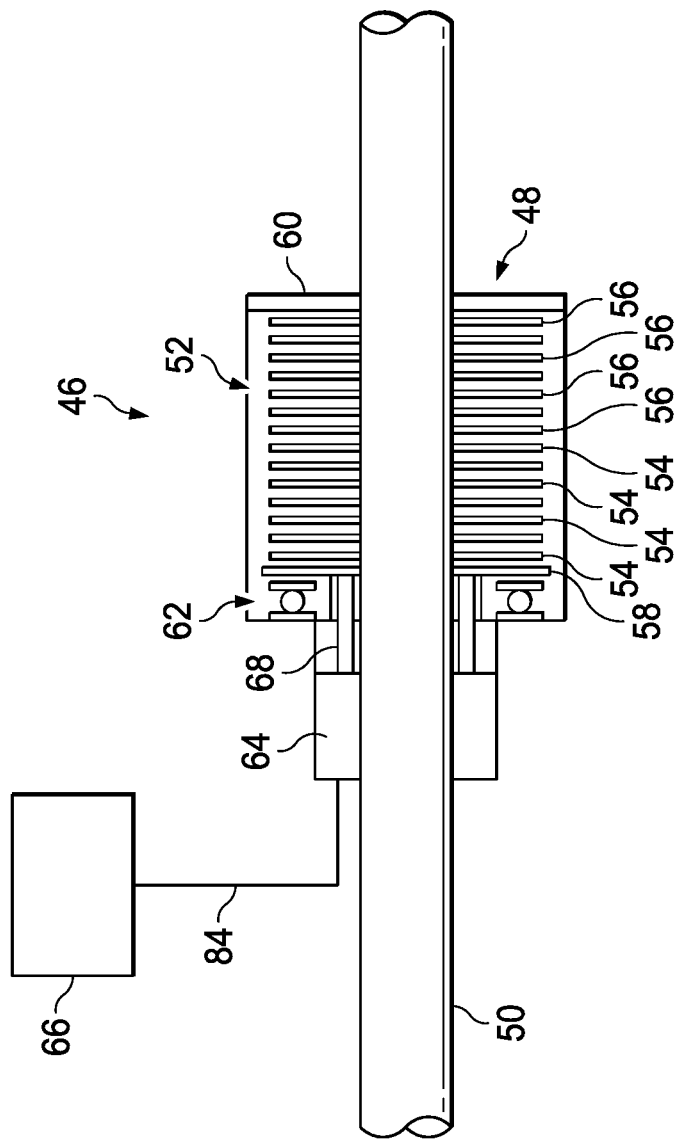
FIG. 3 semi-schematically depicts a cross-section of an illustrative high-lift device brake suitable for the distributed high-lift device brake systems of the present disclosure.

A representative high-lift device brake 46 is shown in FIG. 3, and can include a brake assembly 48 that is capable, upon activation, to lock the associated extendable high-lift device 17 in its current position. That is, upon activation of brake assembly 48, the associated extendable high-lift device 17 can be securely immobilized by high-lift device brake 46, such that extendable high-lift device 17 can be neither deployed nor retracted, but remains substantially in the position the extendable high-lift device 17 was in when brake assembly 48 was activated. Brake assembly 48 can be directly coupled to a segment 50 of torque tube assembly 38, and actuator 42 of an individual extendable high-lift device 17 can be coupled to segment 50 of torque tube assembly 38, so that by immobilizing torque tube segment 50, actuator 42 is also immobilized, thereby locking extendable high-lift device 17 in place.

Brake assembly 48 can employ any suitable braking mechanism, including drum brakes, disk brakes, and the like. Brake assembly 48 can include a brake disk stack 52. More specifically, brake disk stack 52 can include a plurality of alternating stator disks 54 and rotor disks 56, a pressure plate 58 and a back plate 60, such that activation of brake assembly 48 causes pressure plate 58 to compress the stack of stator disks 54 and rotor disks 56 together against back plate 60. The resulting frictional interengagement of the interleaved stator and rotor disks creates a desired braking force, which immobilizes torque tube segment 50. Pressure plate 58 can be urged against brake disk stack 52 by any conventional means, including hydraulic pressure, pneumatic pressure, electromechanical pressure, and the like.

High-lift device brake 46 can also include a torque-based brake activator 62 that is configured to activate brake assembly 48, for example by compressing brake disk stack 52 between pressure plate 58 and back plate 60, when a torque being applied to actuator 42 by torque tube segment 50 exceeds a predetermined threshold. Torque-based brake activator 62 can include, for example, a ball-detent type brake activator. Ball-detent type brake activators can include two component plates having mirror-image detents machined into each plate. Rollers, most typically spheres, rest between the plates within the detents, and the plates are held together for example by calibrated springs. As torque tube segment 50 transmits torque to the load half of torque-based brake activator 62, the entire brake activator assembly rotates in unison unless and until the torque input exceeds the capacity of the calibrated springs holding the component's activation plates together. In such situations, the axial force applied by the calibrated springs is insufficient to hold the plates together. As the plates move apart, the rollers move out of their detents, thereby increasing the distance between the two plates and simultaneously compressing brake disk stack 52, braking the torque tube segment. When the overload is removed, the rollers can resettle into the detents and release brake disk stack 52.

Brake assembly 48 typically has a braking capacity that is more than sufficient to immobilize the associated high-lift device, in order to safely respond to an excessive torque load that can engage torque-based brake activator 62. High-lift device brake 46 can take advantage of that existing brake capacity by additionally incorporating a flight control brake activator 64 that is electronically coupled to a flight control system 66 of aircraft 10, as shown in FIG. 3. Flight control brake activator 64 can be configured to respond to an activation signal from a flight control system 66 of aircraft 10 by activating brake disk stack 52. The activation of brake disk stack 52 by flight control brake activator 64 can be alternative to, or in addition to, activation of brake disk stack 52 via torque-based brake activator 62. Flight control brake activator 64 can employ an alternative activation mechanism to engage brake disk stack 52. For example, flight control brake activator 64 can include a solenoid 68, such that upon flight control brake activator 64 receiving the activation signal from flight control system 66, solenoid 68 is energized and compresses brake disk stack 52 sufficiently to immobilize actuator 42, and therefore also immobilize extendable high-lift device 17.

Figure 4:
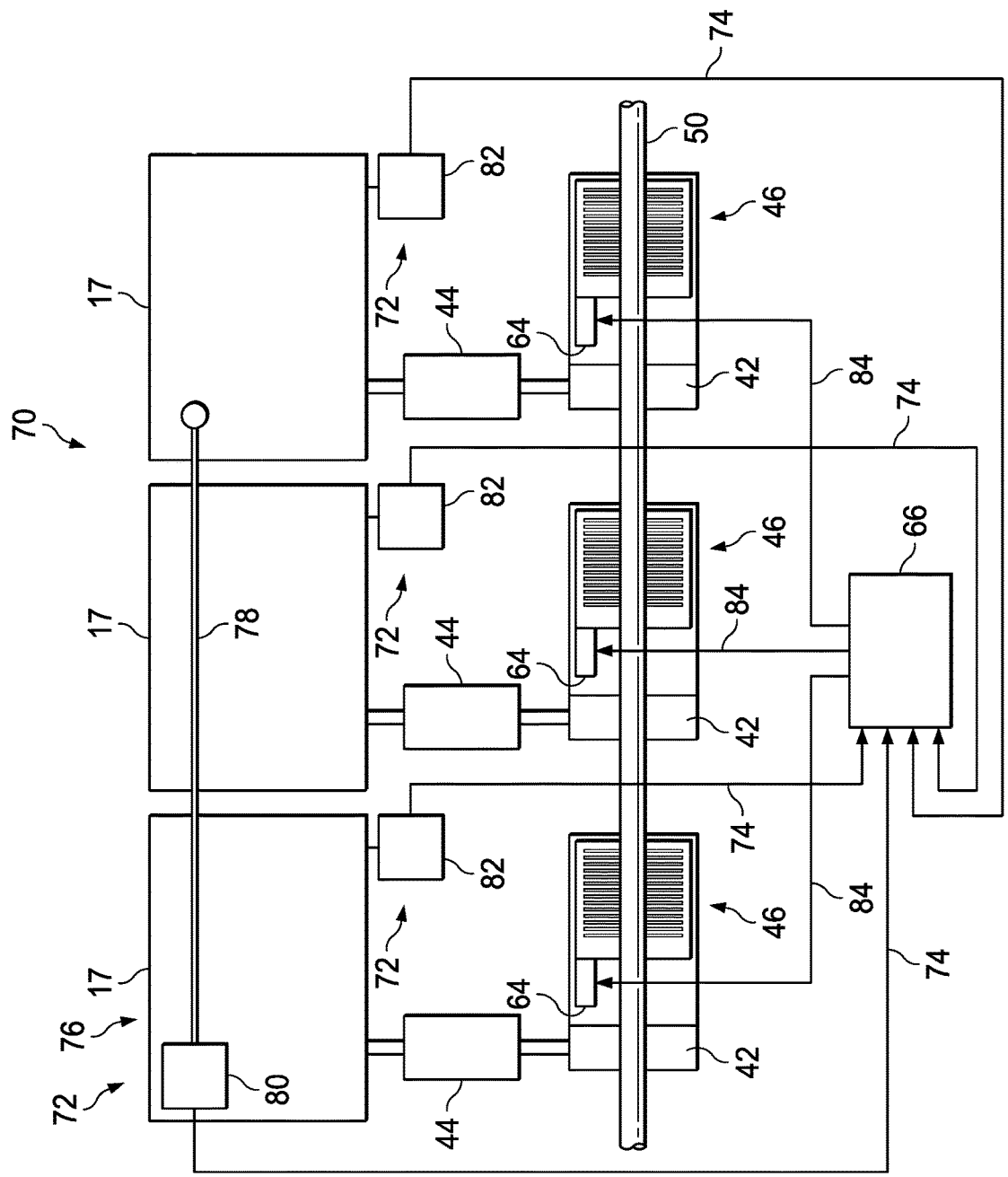
FIG. 4 schematically depicts an illustrative distributed high-lift device brake system for an aircraft, according to the present disclosure.

A representative portion of a distributed high-lift device brake system 70 for aircraft 10 is shown in FIG. 4, where the distributed high-lift device brake system 70 can include a plurality of extendable high-lift devices 17, a plurality of actuators 42, where each actuator is coupled to a corresponding extendable high-lift device 17 so that activation the actuator extends or retracts the coupled extendable high-lift device 17, either directly or via an intermediate mechanism 44.

Distributed high-lift device brake system 70 can further include one or more segments 50 of a torque tube assembly 38 coupled to each of the plurality of extendable high-lift devices 17 via actuators 42 and optionally intermediate mechanism 44. Torque tube segment 50 can be driven by remote drive unit 39, and the plurality of actuators 42 are configured to be activated by the rotation of the torque tube segment 50 by remote drive unit 39.

Each of the extendable high-lift devices 17 of distributed high-lift device brake system 70 can include a high-lift device brake 46 associated with the extendable high-lift device 17, where each high-lift device brake 46 can include a brake assembly 48 that is capable of locking the high-lift device in its current position, a torque-based brake activator 62 that is configured to activate brake assembly 48 when torque applied to actuator 42 by torque tube segment 50 exceeds a predetermined threshold, and a flight control brake activator 64 that is configured to activate at least brake assembly 48 and lock extendable high-lift device 17 in its current position when flight control brake activator 64 receives an activation signal from flight control system 66 of aircraft 10.

Also as shown in FIG. 4, flight control system 66 can be configured to detect an asymmetric positioning of one or more extendable high-lift devices 17 via one or more sensors 72 in electronic contact with flight control system 66 via an appropriate wired or wireless network 74. Any sensor already in use for, or capable of use for, the detection of unsynchronized high-lift device movement on an aircraft is an appropriate sensor for the purposes of this disclosure.

Aircraft 10 may include one or more types of sensors 72 that capable of detecting unsynchronized movement or asymmetric positioning of one or more high-lift devices by, for example, detecting an asymmetry in the positioning of one or more high-lift devices, and/or by detecting the position of an individual high-lift device.

An exemplary asymmetric detection sensor can include a lanyard sensor 76, where asymmetric movement of one or more slats in slat system 21 can result in an increased tension applied to lanyard 78 as it runs along the surfaces of the slats. The resulting increased tension in lanyard 78 can be detected by a lanyard tension sensor 80. If a difference in position between one or more high-lift devices in slat system 21 is detected, and the detected difference exceeds a preset allowance, lanyard sensor 76 can transmit a signal to flight control system 66 that one or more high-lift devices in slat system 21 are in an unsynchronized or asymmetric position.

Alternatively, or in addition, Aircraft 10 can include one or more sensors 72 that are high-lift device position sensors 82 that are configured to detect an absolute or a relative position of an associated extendable high-lift device 17 directly. For example, where extendable high-lift device 17 can be rotated into position when deployed, the position of extendable high-lift device 17 can be monitored by a high-lift device position sensor 82 that is an angular position sensor.

Flight control system 66 can be configured to detect an unsynchronized movement of at least one of a plurality of extendable high-lift devices 17 via the one or more sensors 72, and in response to detecting such an unsynchronized movement, send an activation signal to the associated flight control brake activator 64 of the high-lift device brake 46 associated with the at least one unsynchronized extendable high-lift device 17 via a wired or wireless electronic network 84, which may be the same or different than network 74, thereby immobilizing those high-lift devices in their current positions.

Flight control system 66 can be configured so that it is capable of locking each of the plurality of extendable high-lift devices in a high-lift device system in its current position individually, by sending an activation signal to flight control brake activator 64 of the individual high-lift device brake 46 associated with each extendable high-lift device.

Aircraft 10 and flight control system 66 can be configured so that upon detecting an unsynchronized high-lift device movement, an alert is generated to inform the flight crew that the unsynchronized high-lift device movement has been detected. It may be preferable for flight control system 66, upon receiving the signal transmitted by one or more sensors 72 indicating an unsynchronized high-lift device movement, to automatically transmit an activation signal to flight control brake activator 64 of the individual high-lift device brake 46 associated with the high-lift device or devices determined to be in an unsynchronized position.

(4) Methods of Actuation

Figure 5:
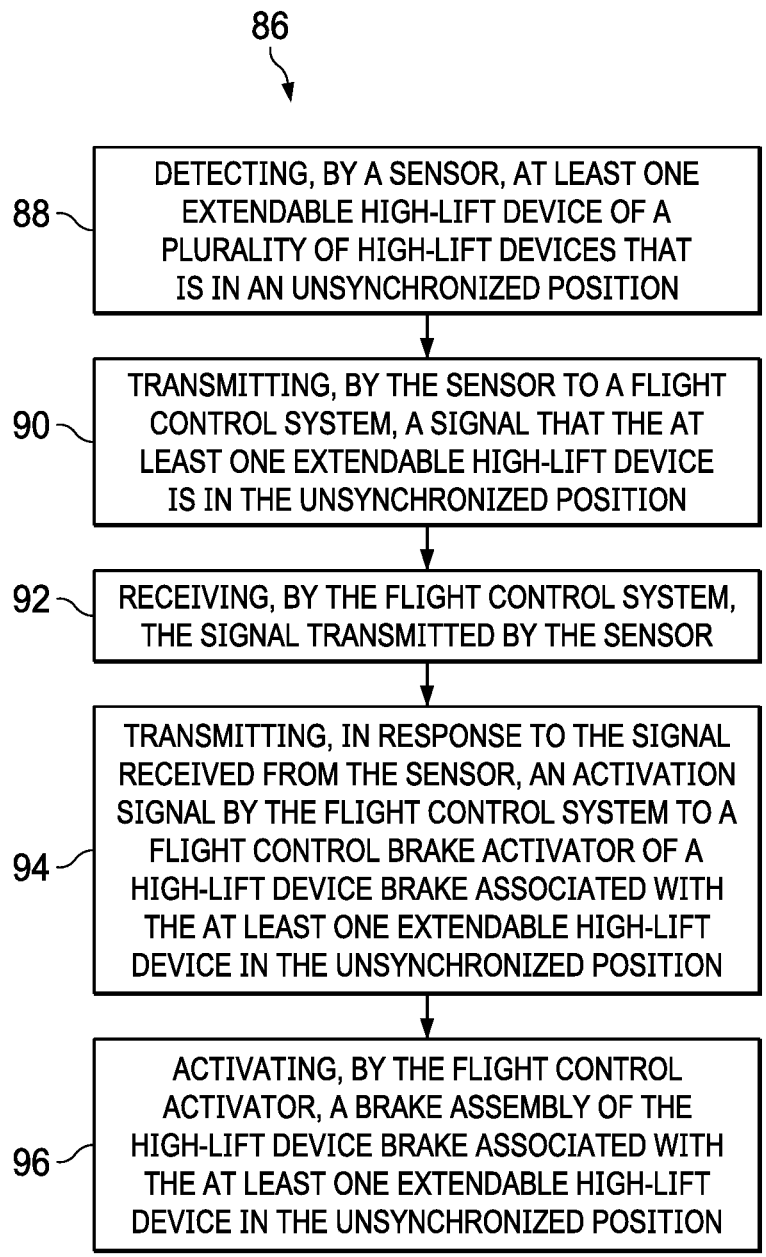
FIG. 5 is a flowchart depicting an illustrative method of actuating a distributed brake system for a plurality of high-lift devices of an aircraft, according to the present disclosure.

The actuation of a distributed brake system for a plurality of high-lift devices of an aircraft may be accomplished according to flowchart 86 of FIG. 5. The method of actuating can include detecting, by a sensor 72, at least one extendable high-lift device 17 of the plurality of extendable high-lift devices 21 in an unsynchronized position, as shown at step 88 of flowchart 86. The method of actuating can further include transmitting, by the sensor 72 to a flight control system 66 of the aircraft 10, a signal that the at least one high-lift device is in the unsynchronized position, as shown at step 90 of flowchart 86. The method of actuating can further include receiving, by the flight control system 66 of the aircraft, the signal transmitted by the sensor 72, as shown at step 92 of flowchart 86. The method of actuating can further include transmitting, in response to the signal received from the sensor, an activation signal by the flight control system of the aircraft to a flight control brake activator 64 of the high-lift device brake 46 associated with the at least one extendable high-lift device in the unsynchronized position, as shown at step 94 of flowchart 86. The method of actuating can further include activating, by the flight control brake activator 64, a brake assembly 48 of the high-lift device brake associated with the at least one extendable high-lift device in the unsynchronized position, as shown at step 96 of flowchart 86.

The step of activating the brake assembly 48 of the high-lift device brake 46 associated with the at least one extendable high-lift device 17 in the unsynchronized position can further include locking the said at least one extendable high-lift device in its current position.

The step of detecting the said at least one extendable high-lift device 17 of the plurality of extendable high-lift devices 21 in an unsynchronized position can include detecting the said at least one extendable high-lift device that is in an unsynchronized position due to a failure of a torque tube coupled to said at least one extendable high-lift device.

When actuating the distributed brake system, flight control system 66 of aircraft 10 can be configured to automatically transmit the activation signal to flight control brake activator 64 of high-lift device brake 46 associated with the at least one extendable high-lift device 17 in the unsynchronized position in response to receiving the signal transmitted by sensor 72.

The step of transmitting the activation signal by flight control system 66 to flight control brake activator 64 of high-lift device brake 46 can include individually transmitting an activation signal to each high-lift device brake 46 associated with said at least one extendable high-lift device 17.

The step of activating brake assembly 48 of high-lift device brake 46 can include activating brake assembly 48 via torque-based brake activator 62 when a torque applied to actuator 42 coupled to the at least one extendable high-lift device 17 in the unsynchronized position exceeds a predetermined threshold.

(5) Illustrative Combinations and Additional Examples

This section describes additional aspects and features of the disclosed high-lift device brake apparatus, brake systems, and methods of actuation, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A high-lift device brake apparatus for an aircraft, comprising: an extendable high-lift device; an actuator coupled to the extendable high-lift device such that activation of the actuator extends or retracts the extendable high-lift device; a torque tube coupled to a remote drive unit, where rotation of the torque tube activates the actuator; and a high-lift device brake, including a brake assembly capable to lock the extendable high-lift device in a current position; a torque-based brake activator configured to activate the brake assembly when a torque applied to the actuator by the torque tube exceeds a predetermined threshold; and a flight control brake activator configured to activate the brake assembly to lock the extendable high-lift device in the current position when the flight control brake activator receives an activation signal from a flight control system of the aircraft.

A2. The high-lift device brake apparatus of paragraph A1, where the brake assembly includes a frictional disk stack.

A3. The high-lift device brake apparatus of paragraph A1, where the torque-based brake activator is a ball-detent torque-based brake activator.

A4. The high-lift device brake apparatus of paragraph A1, where the extendable high-lift device is a slat or a Krueger flap disposed at a leading edge of a wing.

A5. The high-lift device brake apparatus of paragraph A1, where the actuator is a geared rotary actuator, where the extendable high-lift device is a slat, and where the geared rotary actuator is coupled to the slat via a pinion gear.

A6. The high-lift device brake apparatus of paragraph A1, where the extendable high-lift device is a flap disposed at a trailing edge of a wing.

A7. The high-lift device brake apparatus of paragraph A1, where the actuator is a linear actuator, where the extendable high-lift device is a flap, and where the linear actuator is coupled to the flap.

B1. A distributed high-lift device brake system for an aircraft, comprising: a plurality of extendable high-lift devices; a plurality of actuators, each actuator coupled to each extendable high-lift device such that activation of said actuator extends or retracts said coupled extendable high-lift device; a torque tube coupled to each of the plurality of extendable high-lift devices, where the torque tube is driven by a remote drive unit, and where the plurality of actuators coupled to the plurality of extendable high-lift devices is configured for activation by rotation of the torque tube by the remote drive unit; and a high-lift device brake associated with each of the plurality of extendable high-lift devices, each high-lift device brake including: a brake assembly capable to lock said extendable high-lift device in a current position; a torque-based brake activator configured to activate the brake assembly when a torque applied to said actuator, coupled to said extendable high-lift device, by said torque tube exceeds a predetermined threshold; and a flight control brake activator configured to activate at least said brake assembly and lock said extendable high-lift device in the current position when the flight control brake activator receives an activation signal from a flight control system of the aircraft.

B2. The high-lift device brake system of paragraph B1, where the plurality of extendable high-lift devices includes slat devices disposed at a leading edge of a wing of the aircraft.

B3. The high-lift device brake system of paragraph B1, where the plurality of extendable high-lift devices includes flap devices disposed at a trailing edge of a wing of the aircraft.

B4. The high-lift device brake system of paragraph B1, where the plurality of extendable high-lift devices includes Krueger flap devices disposed at a leading edge of a wing of the aircraft, adjacent a fuselage of the aircraft.

B5. The high-lift device brake system of paragraph B1, where the flight control system of the aircraft is configured to detect an unsynchronized movement of at least one extendable high-lift device of the plurality of extendable high-lift devices, respond by sending the activation signal to the flight control brake activator of said at least one extendable high-lift device having the unsynchronized movement, and lock said at least one extendable high-lift device in the current position.

B6. The high-lift device brake system of paragraph B1, where the flight control system is capable of locking each extendable high-lift device of the plurality of extendable high-lift devices in the current position individually by sending the activation signal to the flight control brake activator of the high-lift device brake associated with each extendable high-lift device of the plurality of extendable high-lift devices.

C1. A method of actuating a distributed brake system for a plurality of high-lift devices of an aircraft, where each high-lift device is coupled to a high-lift device brake; the method comprising: detecting, by a sensor, at least one extendable high-lift device of the plurality of extendable high-lift devices in an unsynchronized position relative to a remainder of the plurality of extendable high-lift devices; transmitting, by the sensor to a flight control system of the aircraft, a signal that the at least one high-lift device is in the unsynchronized position; receiving, by the flight control system of the aircraft, the signal transmitted by the sensor; transmitting, in response to the signal received from the sensor, an activation signal by the flight control system of the aircraft to a flight control brake activator of the high-lift device brake associated with the at least one extendable high-lift device in the unsynchronized position; and activating, by the flight control brake activator, a brake assembly of the high-lift device brake associated with the at least one extendable high-lift device in the unsynchronized position.

C2. The method of paragraph C1, where activating the brake assembly of the high-lift device brake associated with the at least one extendable high-lift device in the unsynchronized position locks said at least one extendable high-lift device in a current position.

C3. The method of paragraph C1, where the at least one extendable high-lift device in the unsynchronized position, detected by the sensor, is in the unsynchronized position due to a failure of a torque tube coupled to said at least one extendable high-lift device.

C4. The method of paragraph C1, where the flight control system of the aircraft is configured to automatically transmit the activation signal to the flight control brake activator of the high-lift device brake associated with the at least one high-lift device in the unsynchronized position in response to receiving the signal transmitted by the position sensor.

C5. The method of paragraph C1, where transmitting the activation signal by the flight control system to the flight control brake activator of the high-lift device brake associated with the at least one extendable high-lift device in the unsynchronized position includes individually transmitting the activation signal to the high-lift device brake associated with said at least one extendable high-lift device.

C6. The method of paragraph C1, where activating the brake assembly of the high-lift device brake includes activating a brake disk stack of the high-lift device brake by the flight control brake activator.

C7. The method of paragraph C1, where activating the brake assembly of the high-lift device brake includes activating a brake disk stack of the high-lift device brake that is configured to be alternatively activated by a torque-based brake activator.

(6) Advantages, Features, and Benefits

The high-lift device brakes, high-lift device brake systems, and methods of actuating high-lift device brakes disclosed herein provide significant benefits when compared to prior devices and systems for preventing high-lift device asymmetry in operation.

Existing brake capacity for high-lift devices, already present in torque-limiting brake devices, is adapted for active braking of the high-lift devices. This permits the no-back brake systems for the high-lift device to be eliminated. In addition to decreased weight and a simplified high-lift brake device, by eliminating the no-back brakes the need for regular passive no-back brake verification tests is also eliminated. These verification tests can require physically disconnecting the torque tube driveline from the no-back brake, a difficult and time-consuming task.

In addition, while some high-lift device brake systems include active brake systems at the tips of wings, as a safety measure in the event the inboard drive system is disconnected, such wing-tip systems can permit high-lift device movement in the event of a second drive line disconnect event. The distributed high-lift device brake systems of the present disclosure can be applied to each high-lift device independently, regardless of the functionality of the drive system.

The presently described high-lift device brakes and brake systems are lighter, less complex, and offer enhanced safety and less onerous testing procedures than current no-back brake systems.

(7) Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A high-lift device brake apparatus for an aircraft, comprising:
an extendable high-lift device;
an actuator coupled to the extendable high-lift device such that activation of the actuator extends or retracts the extendable high-lift device;
a torque tube coupled to a remote drive unit, wherein rotation of the torque tube activates the actuator; and
a high-lift device brake, including:
a brake assembly capable to lock the extendable high-lift device in a current position, the brake assembly including a pressure plate, a back plate, and a frictional disk stack located between the pressure plate and the back plate;
a torque-based brake activator configured to activate the brake assembly when a torque applied to the actuator by the torque tube exceeds a predetermined threshold; and
a flight control brake activator including a solenoid configured to activate the brake assembly by applying pressure to the frictional disk stack via the pressure plate, to lock the extendable high-lift device in the current position when the flight control brake activator receives an activation signal from a flight control system of the aircraft.

2. The high-lift device brake apparatus of claim 1, wherein the torque-based brake activator is a ball-detent torque-based brake activator.

3. The high-lift device brake apparatus of claim 1, wherein the extendable high-lift device is a slat or a Krueger flap disposed at a leading edge of a wing.

4. The high-lift device brake apparatus of claim 1, wherein the actuator is a geared rotary actuator, wherein the extendable high-lift device is a slat, and wherein the geared rotary actuator is coupled to the slat via a pinion gear.

5. The high-lift device brake apparatus of claim 1, wherein the extendable high-lift device is a flap disposed at a trailing edge of a wing.

6. The high-lift device brake apparatus of claim 1, wherein the actuator is a linear actuator, wherein the extendable high-lift device is a flap, and wherein the linear actuator is coupled to the flap.

7. A distributed high-lift device brake system for an aircraft, comprising:
a plurality of extendable high-lift devices;
a plurality of actuators, each actuator coupled to each extendable high-lift device such that activation of said actuator extends or retracts said coupled extendable high-lift device;
a torque tube coupled to each of the plurality of extendable high-lift devices, wherein the torque tube is driven by a remote drive unit, and wherein the plurality of actuators coupled to the plurality of extendable high-lift devices is configured for activation by rotation of the torque tube by the remote drive unit; and
a high-lift device brake associated with each of the plurality of extendable high-lift devices, each high-lift device brake including:
a brake assembly capable to lock said extendable high-lift device in a current position, the brake assembly including a pressure plate, a back plate, and a frictional disk stack located between the pressure plate and the back plate;
a torque-based brake activator configured to activate the brake assembly when a torque applied to said actuator, coupled to said extendable high-lift device, by said torque tube, exceeds a predetermined threshold; and
a flight control brake activator including a solenoid configured to activate at least said brake assembly by applying pressure to the frictional disk stack via the pressure plate, to lock said high-lift device in the current position when the flight control brake activator receives an activation signal from a flight control system of the aircraft.

8. The distributed high-lift device brake system of claim 7, wherein the plurality of extendable high-lift devices includes slat devices disposed at a leading edge of a wing of the aircraft.

9. The distributed high-lift device brake system of claim 7, wherein the plurality of extendable high-lift devices includes flap devices disposed at a trailing edge of a wing of the aircraft.

10. The distributed high-lift device brake system of claim 7, wherein the plurality of extendable high-lift devices includes Krueger flap devices disposed at a leading edge of a wing of the aircraft, adjacent a fuselage of the aircraft.

11. The distributed high-lift device brake system of claim 7, wherein the flight control system of the aircraft is configured to detect an unsynchronized movement of at least one extendable high-lift device of the plurality of extendable high-lift devices, respond by sending the activation signal to the flight control brake activator of said at least one extendable high-lift device having the unsynchronized movement, and lock said at least one extendable high-lift device in the current position.

12. The distributed high-lift device brake system of claim 7, wherein the flight control system is capable of locking each extendable high-lift device of the plurality of extendable high-lift devices in the current position individually by sending the activation signal to the flight control brake activator of the high-lift device brake associated with each extendable high-lift device of the plurality of extendable high-lift devices.

13. A method of actuating a distributed brake system for a plurality of extendable high-lift devices of an aircraft, where each extendable high-lift device is coupled to a high-lift device brake; the method comprising:
detecting, by a sensor, at least one extendable high-lift device of the plurality of extendable high-lift devices in an unsynchronized position relative to a remainder of the plurality of extendable high-lift devices;
transmitting, by the sensor to a flight control system of the aircraft, a signal that the at least one extendable high-lift device is in the unsynchronized position;
receiving, by the flight control system of the aircraft, the signal transmitted by the sensor;
transmitting, in response to the signal received from the sensor, an activation signal by the flight control system of the aircraft to a flight control brake activator of the high-lift device brake associated with the at least one extendable high-lift device in the unsynchronized position; and
activating, by the flight control brake activator, a brake assembly of the high-lift device brake associated with the at least one extendable high-lift device in the unsynchronized position;
wherein the brake assembly includes a pressure plate, a back plate, and a frictional disk stack located between the pressure plate and the back plate, wherein the flight control brake activator includes a solenoid, and wherein activating includes applying pressure with the solenoid to the frictional disk stack via the pressure plate.

14. The method of claim 13, wherein activating the brake assembly of the high-lift device brake associated with the at least one extendable high-lift device in the unsynchronized position locks said at least one extendable high-lift device in a current position.

15. The method of claim 13, wherein the at least one extendable high-lift device in the unsynchronized position, detected by the sensor, is in the unsynchronized position due to a failure of a torque tube coupled to said at least one extendable high-lift device.

16. The method of claim 13, wherein the flight control system of the aircraft is configured to automatically transmit the activation signal to the flight control brake activator of the high-lift device brake associated with the at least one extendable high-lift device in the unsynchronized position in response to receiving the signal transmitted by the sensor.

17. The method of claim 13, wherein transmitting the activation signal by the flight control system to the flight control brake activator of the high-lift device brake associated with the at least one extendable high-lift device in the unsynchronized position includes individually transmitting the activation signal to the high-lift device brake associated with said at least one extendable high-lift device.

18. The method of claim 13, wherein the brake assembly of the high-lift device brake is configured to be alternatively activated by a torque-based brake activator.

19. The method of claim 13, wherein detecting is performed using a lanyard sensor.

20. The method of claim 13, wherein the at least one extendable high-lift device of the plurality of extendable high-lift devices includes at least one slat.

* * * * *